United States Patent [19]

Kramer

[11] Patent Number: 4,973,112
[45] Date of Patent: Nov. 27, 1990

[54] HOLOGON DEFLECTION SYSTEM HAVING DISPERSIVE OPTICAL ELEMENTS FOR SCAN LINE BOW CORRECTION, WAVELENGTH SHIFT CORRECTION AND SCANNING SPOT ELLIPTICITY CORRECTION

[75] Inventor: Charles J. Kramer, Rochester, N.Y.

[73] Assignee: Holotek Ltd., Rochester, N.Y.

[21] Appl. No.: 278,632

[22] Filed: Dec. 1, 1988

[51] Int. Cl.[5] .......................... G02B 26/10; G02B 5/32
[52] U.S. Cl. ................................................. 350/3.71
[58] Field of Search ....................... 350/3.71, 6.8, 3.70

[56] References Cited

U.S. PATENT DOCUMENTS

| | | | |
|---|---|---|---|
| 3,940,202 | 1/1976 | Kato et al. | 350/3.71 |
| 3,953,105 | 3/1976 | Ih | 350/3.71 |
| 4,084,881 | 4/1978 | Hirabayashi | 350/6.8 |
| 4,094,576 | 6/1978 | Heiling | 350/3.71 |
| 4,121,883 | 10/1978 | Goshima et al. | 350/6.8 |
| 4,165,464 | 8/1979 | Ikeda et al. | 350/3.71 X |
| 4,176,907 | 12/1979 | Matsumoto et al. | 350/3.71 |
| 4,289,371 | 10/1981 | Kramer | 350/3.71 |
| 4,428,643 | 1/1984 | Kay | 350/3.71 |
| 4,487,472 | 12/1984 | Asano | 350/3.71 |
| 4,583,816 | 4/1986 | Kramer | 350/3.71 |
| 4,610,500 | 9/1986 | Kramer | 350/3.71 |
| 4,626,062 | 12/1986 | Ishikawa | 350/3.71 |
| 4,632,499 | 12/1987 | Noguchi et al. | 350/6.2 |
| 4,707,055 | 11/1987 | Stark | 350/3.71 |
| 4,770,507 | 9/1988 | Arimoto et al. | 350/6.8 |

OTHER PUBLICATIONS

Kramer, C. J., "Hologon Laser Scanners for Nonimpact Printing", Proceedings of SPIE, vol. 390, Jan. 20–21, 1983, pp. 165–173.

Funato, H., "Holographic Scanner for Laser Printer", Proceedings of SPIE, vol. 390, Jan. 20–21, 1983.
R. Kingslake, "Applied Optics and Optical Engineering", vol. II, Opt. Insts., Part II, Academic Press, N.Y. (1969).
C. J. Kramer, "Specification & Acceptance Test Procedures for Hologan Laser Scanner Systems", SPIEC Pro. on Metrology of Optoelectronic Syst. (May 1987).
C. J. Kramer, "Holographic Laser Scanner for Non-Impact Printing", Laser Focus, 78–82 (Jun. 1981).

*Primary Examiner*—Bruce Y. Arnold
*Assistant Examiner*—David R. Parsons
*Attorney, Agent, or Firm*—Martin Lukacher

[57] ABSTRACT

Bow can be minimized by an auxiliary grating in the post deflection path of a diffracted beam from the hologon which is disposed in non-parallel relationship to the plane of rotation of the hologon. The ellipticity of the spot which generates the scan line and intensity variation in the scan beam can be minimized by using a dispersive element, preferably a prism, between the hologon and the bow compensation grating with its dispersion in a direction opposite to the direction of the dispersion of the hologon and of the auxiliary grating.

Another grating before the hologon can be used to correct for wavelength shift induced cross-scan error associated with the dispersion in the hologon and a bow compensation grating following the hologon. A hologon deflector system may incorporate two identical prism elements of essentially the same shape and which are supported on the same body so that scan beam tracking errors associated with movement (vibration) of one of the prisms is compensated by the movement of vibration of the other.

19 Claims, 9 Drawing Sheets

HOLOGON DEFLECTION SYSTEM HAVING DISPERSIVE OPTICAL ELEMENTS FOR SCAN LINE BOW CORRECTION, WAVELENGTH SHIFT CORRECTION AND SCANNING SPOT ELLIPTICITY CORRECTION

The present invention relates to hologon (rotating diffraction grating optical elements which are preferably holographically formed) deflector systems which provide improved scan line bow compensation and may also provide compensation for cross-scan positional beam errors (tracking errors) due to shifts in the optical wavelength of the beam which is deflected and for ellipticity in the shape of the spot which generates the scan line on an image surface as the beam is deflected.

The invention is especially suitable for use in imaging devices for high resolution reprographics (phototypesetting and photocomposition) where repetitive, collinear and straight scan lines are required. The invention may also find application wherever laser beam scanning is carried out.

It is the principal feature of this invention to provide hologon deflector systems incorporating dispersive optical elements (gratings and prisms) to correct for deviations from straightness in the scan line due to the inherent bowing of the scan line by rotating hologon deflector discs and for beam tracking errors due to shifts in the wavelength of the laser beam and also to reduce the ellipticity of the spot which generates the scan line on the image surface and may cause changes in the width thereof. The invention also enables the use of grating, dispersive elements having periodicities such that the ratio of $\lambda$, the optical wavelength of the beam, to D, the grating period, ($\lambda/D$), to have values which avoid intensity variations in the diffracted beam and provide high radiometric or diffraction efficiency.

The scan line bow compensation features of the invention, and the embodiments of hologon deflector system for carrying out several aspects of the invention, have been described together with the background of this invention in a paper authored by the inventor hereof, Charles J. Kramer entitled "Hologon Deflector Incorporating Dispersive Optical Elements for Scan Line Bow Correction", published in the SPIE Proceeding on Holographic Optics, Design and Applications, Vol. 883, Jan. 13-14, 1988.

As pointed out in the Kramer SPIE article referenced above, it has long been recognized that gratings and prisms introduce bow into image lines and can therefore be used to correct for bow in a line generated by a beam which is incident on the element (the prism or grating) at varying incidence angles. In addition to the texts and patents cited in the Kramer article in this connection ("Applied Optics and Optical Engineering", Vol. V, Optical Instruments Part II, Rudolf Kingslake, Ed., Academic Press New York 1969; Kramer Pat. No. 4,583,816; and C. J. Kramer, "Specification and Acceptance Test Procedures for Hologon Laser Scanner Systems", SPIE Proceedings on Metrology of Optoelectronic Systems, May 1987) reference may be had to the following patents and patent documents: Kay, 4,428,643, January 1984 (deals with wavelength shift correction); Asano, 4,487,472, December 1984; Ishikawa, 4,626,062, December, 1986; Noguchi et al., 4,632,499, December 1986, Ikedo, 4,165,464, August 1979 and Stark, 4,707,055, November, 1987.

A principal advantage that an auxiliary grating provides when compared to the use of prism for scan line bow reduction is that the dispersive properties of the grating are closer to that of the hologon, and therefore, the grating reduces the bow from the hologon to a greater extent than what is achieved using prism elements alone. The problem associated with using a grating element to compensate for the scan bow from a hologon is that the $\lambda/D$ ratio of the auxiliary grating element is less than 0.6 for hologon having a $\lambda/D$ ratio greater than 1.0. A $\lambda/D$ ratio of less 0.6 causes intensity problems since in addition to the desired first diffracted order, there exists higher diffracted orders for surface relief gratings formed in photoresist. These higher diffraction orders take energy from the first order, thereby, reducing the radiometric efficiency of the system. Also, these higher orders interfere with the first order due to multiple reflections and can cause intensity variations in the scan beam.

It has been found in accordance with this invention, as the data presented in the above-referenced 1988 SPIE article by the inventor hereof shows, that an auxiliary bow correction grating incorporated in certain geometry with the hologon disc avoids the foregoing problems and provides many advantages over prism arrangements used for scan line bow compensation.

When dispersive elements are used for bow correction, their dispersion (the direction in which they deflect the beam) is in the same direction as the dispersion from the hologon. The amount of dispersion introduced by a prism is not as great as that from a grating; the dispersing power of a grating being much higher than that of a prism. All dispersive elements inherently introduce ellipticity in the spot defined by the intersection of the beam and the image surface. The laser beam is generated with a circular cross-section. However, as the beam scans on opposite sides of the center of scan, the dispersion introduces ellipticity which is greatest at the ends of the scan line, returning to circular shape at the center of scan when the hologon and dispersive bow compensation elements are used at the minimum deviation condition.

In the hologon deflector that uses $\lambda/D = 1.4142$ and the incident angle to the hologon, $\theta_i$, approximately equal to the diffraction angle from the hologon, $\theta_d$, such that the hologon is operated at the minimum deviation condition with $\theta_i \approx \theta_d \approx 45°$, (described in Kramer U.S. Pat. No. 4,289,371, Sept. 15, 1981) the scan line bow is minimized without the use of an auxiliary dispersive element. The spot size becomes elliptically shaped as the beam is scanned off axis for a circular shaped input beam. This spot ellipticity increases as a function of scan beam angle for a disc hologon deflector and is a major factor that limits the useful scan angle of these deflectors to less than $\pm 20°$.

Image spot ellipticity occurs in disc hologon deflectors because the incident beam on the grating facet has an elliptical shape that remains stationary with regard to the scanning beam. The projection of this elliptically shaped beam aperture along the diffracted scan beam is circular for the center of scan when the incident beam to the hologon has a circular cross-section. The projection of the elliptically shaped aperture becomes elliptically shaped along the diffracted scan beam as the scan angle increases because the fixed elliptical shaped aperture (the cross-section of the beam defining the aperture) has the wrong projected cross-section shape to produce a circular cross-section beam and resulting image spot (as transformed by the lens). The misalignment between the fixed beam aperture shape on the disc and the required aperture shape for circular cross-section image spots increases with scan angle, and therefore, image spot ellipticity increases with scan angle. The major and minor axes of the image spot, respectively, increase and decrease symmetrically in size from the center of scan, circular cross-section value. These major and minor axes become oriented at about 45° to the scan line direction, with the relative direction of both changing (e.g. clockwise to counterclockwise) as the beam passes through the center of scan.

The spot ellipticity either increases or decreases the overlaps of successive scan lines in a direction that is at 45° to the scan direction. This change in overlap affects the quality of lines or half-tone dots oriented in these directions. An auxiliary grating or prism element added to the system to correct bow, also magnifies the image spot ellipticity problem.

It is a feature of this invention to provide a system utilizing an auxiliary grating for bow correction wherein the ellipticity of the spot is reduced, thereby enabling the use of larger scan angles.

In accordance with this aspect of the invention there is provided an additional dispersive element having a dispersion in a direction opposite from the dispersion of the hologon and the auxiliary bow correction grating. This additional element is disposed between the hologon and the auxiliary grating. The additional element magnifies the bow introduced by the hologon. The auxiliary grating is then provided with sufficient dispersing power to correct the magnified bow. An additional advantage arises from the use of an auxiliary grating having greater dispersing power and therefore higher λ/D ratio than would otherwise be the case. This enables the use of λ/D ratios for the hologon and the auxiliary grating which essentially match each other and which have values resulting in greater radiometric efficiency and the avoidance of second order diffraction effects.

The reduction of image spot ellipticity is further promoted by the use of the bow magnifying dispersive element since the dispersive power of this element is opposite that of the hologon. If the element is a prism that doubles the bow in the scan beam from the hologon, the element will also eliminate the ellipticity in the scan beam intersection in the image plane. Dispersive elements used to compensate for the bow of the hologon not only introduce beam ellipticity, but in effect magnify the ellipticity of the beam leaving the hologon. By eliminating the ellipticity of the beam incident on the grating element, the total ellipticity of the beam which results from the entire system operation is reduced.

A further feature of the invention reduces tracking error in the scan beam. The incident beam size on the hologon in the cross-scan direction is reduced, as is beam tracking error in the bow compensation element in the post-deflection (diffracted) beam from the hologon. In accordance with this feature, two prisms, one located in the incident and the other in the diffracted beam paths to and from the hologon. The prisms are rigidly coupled to a common support so that movement and vibrations in one prism affects the other thereby reducing beam tracking errors associated with movements of the bow compensation prism. The prism in the incident beam demagnifies the beam to a smaller cross-scan beam size on the hologon, while the prism in the diffracted beam corrects for bow and remagnifies the beam so as to obtain the desired spot size on the image surface. Tracking error in the beam from the hologon is thereby reduced by the remagnification factor.

Another feature of the invention is to correct the beam tracking error due to shifts in the wavelength of the laser beam. Such shifts can occur with semi-conductor lasers and, unless compensated, cause beam tracking errors. The wavelength shift is aggravated when an auxiliary dispersive element, particularly an auxiliary grating, is used for bow correction. It has been discovered, in accordance with the invention, that the geometric relationship between a wavelength compensation grating in the incident beam path and the hologon disc can be used to compensate for wavelength shift. Contrary to the teachings of the prior art (see the Kay and Stark patents referenced above), the geometric relationship which has been found to optimally compensate for wavelength shift is where the wavelength compensation grating is disposed tilted (out of parallelism) with respect to the plane of rotation of the hologon disc. The tilt angle is pre-set, taking into account the dispersion of the hologen and the auxiliary bow correction element, and affords great flexibility in the selection of incidence and diffraction angles and periodicities of the hologon and correcting gratings.

The foregoing and other objects, features and advantages of the invention as well as presently preferred embodiments thereof will become more apparent from a reading of the following description in connection with the accompanying drawings in which.

Figure 1:
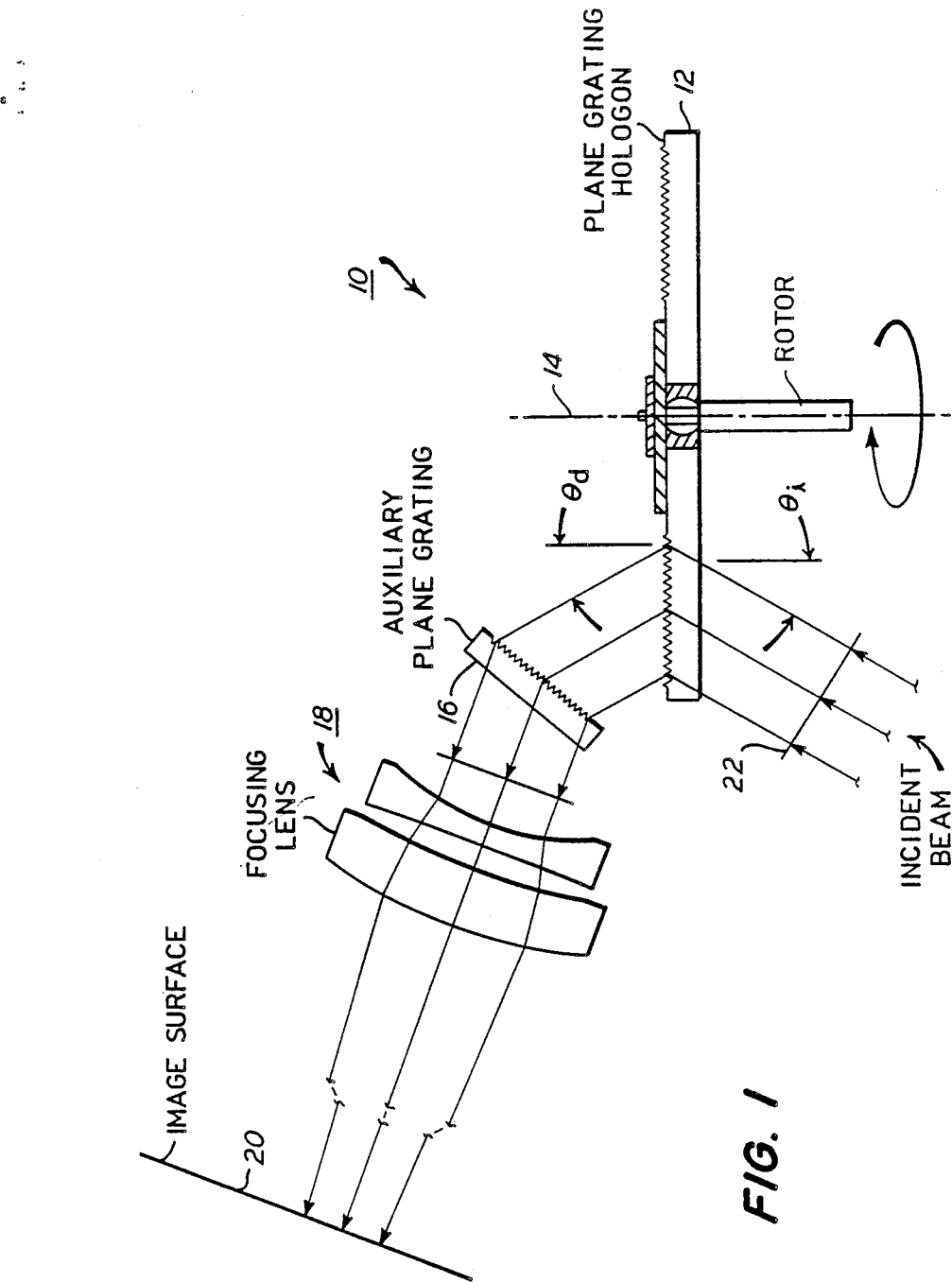
FIG. 1 is a diagrammatic, elevational view of a hologon deflector system in accordance with an embodiment of the invention wherein an auxiliary plane grating is used for scan line bow compensation.
Figure 10A:
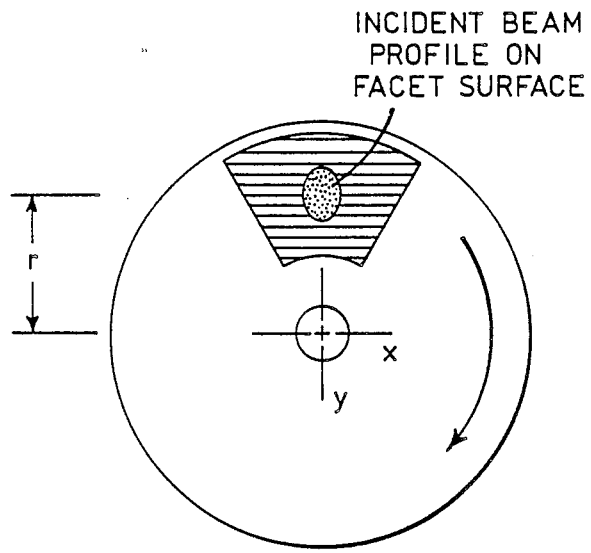
FIGS. 10A and B show two hologon discs, one with facets having tangential grating line orientation, and the other with facets having radial grating line orientation, the single facet illustrated being representative of one of the several adjacent facets around the discs.

Referring to FIG. 1 there is shown, diagrammatically, a hologon deflector system 10 having a plane grating hologon disc 12 which is rotated about an axis 14. The hologon 12 has several grating facets spaced circumferentially in pie-shaped sectors around the hologon disc. As illustrated by the single facet in FIG. 10A, the facets in FIGS. 1-3 and 5-6 have tangential grating line orientation. The hologon is used with a stationary auxiliary plane grating 16 to compensate for bow in the scan beam exiting the hologon. This scan beam is the diffracted, deflected beam. The grating lines in the auxiliary grating are parallel to the hologon facet grating lines for the hologon orientation corresponding to the center of scan. A focusing lens 18 is used to image the scan beam to a spot defined by the intersection with the beam and an image surface which is shown as an image plane. This surface may be movable so as to scan successive, spaced collinear lines. The system 10 may be installed in a housing having the lens 18 mounted at the output end thereof and having a motor mounted thereto, for example as shown in C. J. Kramer Pat. No. 4,610,500 issued Sept. 9, 1986 and also as used in the StraightScan 2P System (sold by Holotek Ltd., 300 East River Road, Rochester, New York 14633) as described in both of the above-referenced SPIE articles authored by C. J. Kramer.

The beam is a laser beam and has a path extending from the laser (not shown) to the hologon where it makes an angle of incidence to a normal to the hologon surface indicated as $\theta_i$. The lines across the beam paths (e.g. 22) indicate that the wave front of the beam is perpendicular to the beam path (collinated beam). The pre-deflection portion of the path extends to the hologon in the YZ plane. The coordinates xy are shown in FIG. 10. Z is, of course, perpendicular to x and y and is the axis of rotation 14. The post-deflection portion of the path starts where the beam exits the hologon 12 and continues until the image surface 20. The diffraction angle $\theta_d$ to the normal to the hologon grating facet is indicated. The diffracted or scan beam changes its angular orientation as the hologon rotates. The optical scan angle about the center of scan (YZ Plane) where the incident beam is symmetrical about the line bisecting the grating facet is related to the hologon rotation angle, $\theta_r$ by:

$$\theta_s \approx K \theta_r \quad (1)$$

Where $\theta_s$ is the optical scan angle about the center of scan and $K = \lambda/D$ where $\lambda$ is the optical wavelength of the beam and D is the grating period of the hologon. This equation is correct for the hologon operated at minimum deviation condition for the center of scan. In dispersive elements (prisms and gratings) beam, magnification and demagnification is anamorphic and occurs only in the direction in which the beam is deviated. The magnification ratio $R_g$ of the output (diffracted) beam diameter to the input (incident) beam diameter to a grating element is given by:

$$R_g = \frac{\cos \theta_d}{\cos \theta_i} \quad (2)$$

where $\theta_i$ and $\theta_d$ are, respectively, the incident and diffracted beam angles with respect to the grating normal as shown in FIG. 1.

It is preferable to orient the hologon 12 and grating 16 so that both are essentially at the minimum deviation condition, $\theta_i$ approximately equal to $\theta_d$.

The hologon 12 produces a bowed scan line on a planar image surface because the geometric relationship of the grating lines and the scan beam changes as the hologon rotates. Reference may be had to the following patents and publications for further information on scan line bow generation in hologon deflectors: C. J. Kramer Pat. No. 4,289,371 issued Sept. 15, 1981, C. J. Kramer, Holographic Laser Scanners For Non-Impact Printing, Laser Focus Magazine pages 78-82, June 1981 and C. J. Kramer, Hologon Laser Scanners For Non-Impact Printing, Proceedings of the SPIE, Vol. 390, pages 165-173, January 1983; Funato, Proceedings of the SPIE, Vol. 390, page 174 (1983), U.S. Pat. Nos. 3,940,202 issued Feb. 24, 1976, 3,953,105 issued Apr. 27, 1976 and 4,094,576 issued June 13, 1978.

The auxiliary grating element 16 bows a scan line because the incident beam changes its angular orientation with respect lo the normal to the grating surface as it scans across the surface. As the angular direction of the scan beam departs from a plane that is perpendicular to the grating lines, the apparent grating line spacing decreases (analogous to railroad track vanishing point phenomenon), and therefore, the beam deviation increases. The relationship between the change in the grating output beam angle, $d\theta'_d$, due to a change in the input beam angle, $d\theta'_i$, is obtained by differentiating the grating equation, $\sin \theta'_i + \sin \theta'_d = K$, with respect to $d\theta'_i$ and results in:

$$d\theta'_i = -\frac{\cos \theta'_i}{\cos \theta'_d} d\theta'_i \quad (3)$$

The scan line bow produced by the grating is in the direction in which the grating diffracts the beam (the dispersion direction) and is symmetric about the center of scan when the central scan ray (the center of the beam) is perpendicular to the grating lines. The grating periodicity D and incidence angle $\theta'_i$ are the parameters that influence the rate of change between $d\theta'_d$ and $d\theta'_i$, and therefore the rate at which bow is introduced into the scan beam. The bow band (the maximum deviation from straight of the scan line) can be reduced, using the auxiliary grating, to a greater extent than with a prism bow correcting element. For the case where K is equal to one, the grating reduces the residual system bow band by approximately 60% of the bow band reduction achieved with the prism bow corrector, when both grating and prism bow compensating elements are operated at the minimum deviation condition. Similar reductions in residual bow band are obtained over a deflector system arranged for geometric bow compensation as described in the above-referenced C. J. Kramer, Laser Focus article and U.S. Pat. No. 4,289,371. The bow correction depends on the $\lambda/D$ ratio of the auxiliary grating and the incident beam angle on the auxiliary grating. See FIG. 14 of the C. J. Kramer SPIE Vol. 883, January 1988 article. The incident beam angle may vary over a range of 0° to 15°. In this range the auxiliary plane grating is in non-planar relationship with the hologon 12, as shown in FIG. 1. In other words the auxiliary grating is tilted with respect to the plane in which the plane grating hologon 12 rotates. Accordingly, significant scan line bow correction results from the use of an auxiliary plane grating which is geometrically oriented as shown in FIG. 1 with the plane of the grating in non-parallel relationship with the plane perpendicular to the axis 14 of rotation of the hologon 12 in which the plane grating hologon rotates.

Figure 2:
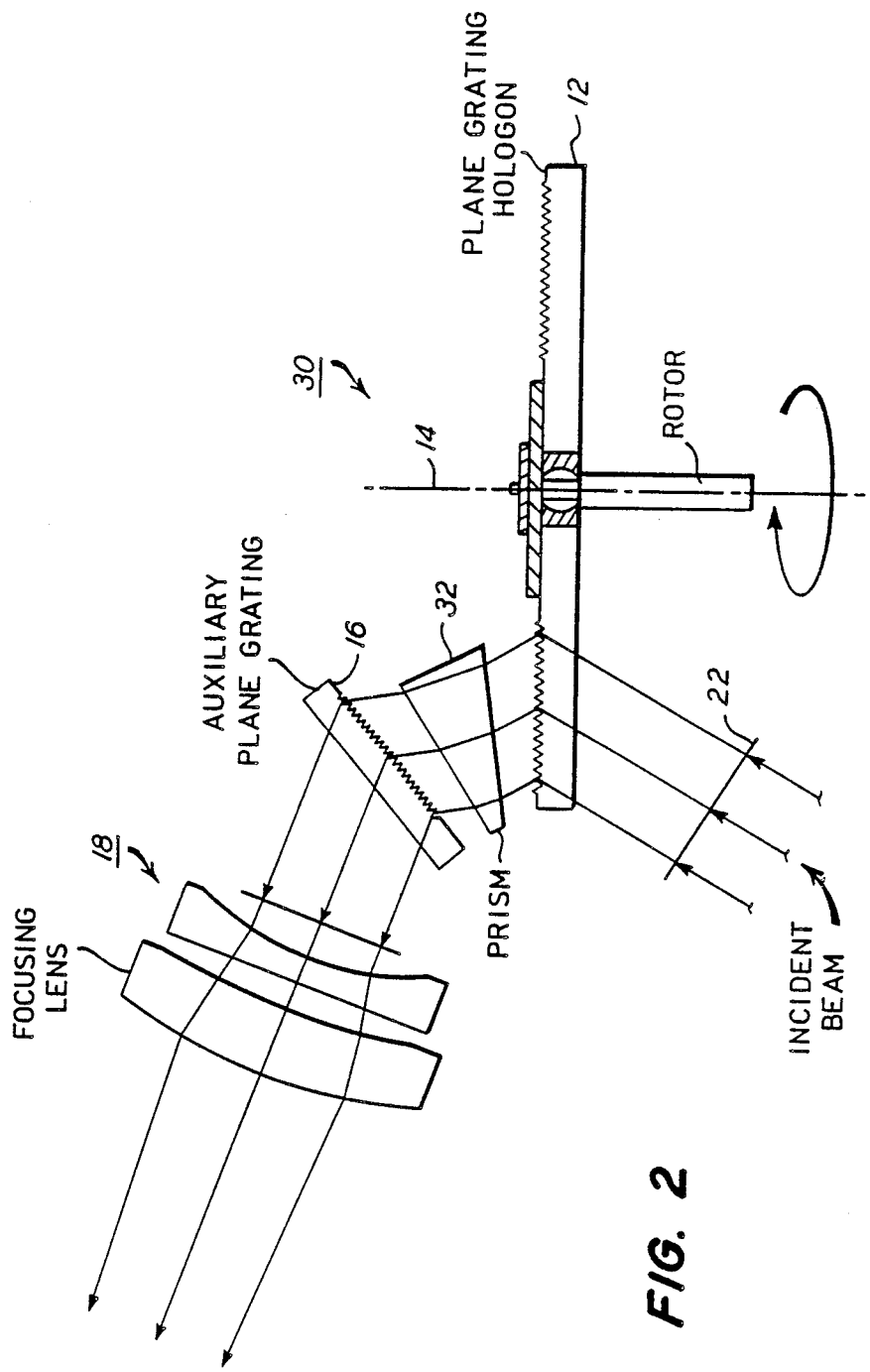
FIG. 2 is a view similar to FIG. 1 of a hologon deflector system in accordance with a further embodiment of the invention which incorporates both a prism and auxiliary bow compensation grating.
Figure 2A:
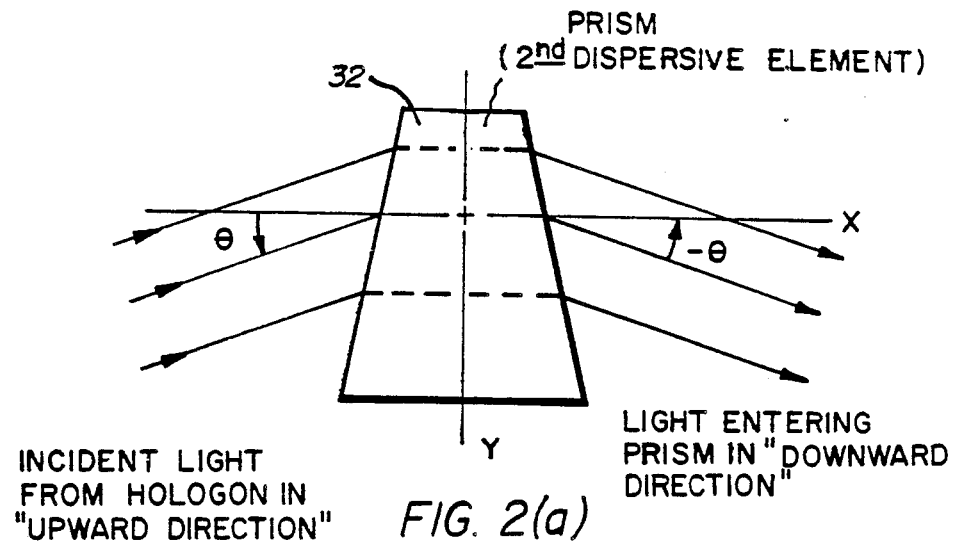
FIG. 2(a) is a detailed enlargement of FIG. 2 showing diagramatically the sense of opposite direction of the beam by deflection by the two dispersive means.

Referring to FIG. 2 there is shown a hologon deflector system 30 similar to that shown in FIG. 1, and like parts are indicated by like reference numerals. The image surface 20 is omitted to simplify the illustration. The system 30 utilizes another dispersive element besides the auxiliary plane grating 16 for bow correction. This element is preferably a prism 32 that magnifies the scan beam bow produced by the hologon 12. The auxiliary plane grating 16 compensates for the magnified scan beam bow. It will be seen from the direction of the diffracted beam from the hologon 12 that the prism dispersion is in a sense opposite to that of the hologon and of the auxiliary plane grating; the prism deflecting the beam in a direction opposite from that of the hologon and of the grating 16. Referring to FIG. 2(a), light from the first dispersive element (hologon) 12 approaches the prism 32 at an angle theta ($\theta$) (in the "upward" direction) with respect to the superimposed x-y coordinate system. After passing through the second dispersive element (prism) 32, light leaves the prism 32 at an angle minus theta ($-\theta$) (in a "downward" direction) with respect to the superimposed coordinate system. In this respect the prism 32 deflects the beam in a direction opposite to the deflection direction caused by hologon 12. The auxiliary grating 16 can then have more dispersing power than was the case in the system 10 shown in FIG. 1. The $\lambda/D$ ratio may then be higher. The $\lambda/D$ may be 1.0 so that the auxiliary grating $\lambda/D$ can be equal to the hologon grating $\lambda/D$. As explained in the C. J. Kramer 1988 SPIE paper, the radiometric efficiency (first order diffraction efficiency) for surface-relief transmission gratings improves for P polarized light when the $\lambda/D$ value is reduced. The first order diffraction efficiency for P polarized light approaches 100% for $\lambda/D$ values of less than 1.1 for these gratings.

The first order diffraction efficiency for S polarized light is essentially 100% for $\lambda/D$ values of between 0.8 and 1.5 for surface-relief transmission gratings. The first order diffraction efficiency for both S and P polarized light decreases to about 33% to 40% for surface-relief transmission gratings for $\lambda/D$ values that are less than 0.6 to 0.7. This decrease in first order diffraction efficiency occurs because more of the incident beam is diffracted into higher orders and into the minus first order. FIG. 14 in the Kramer 1988 paper, indicates that the $\lambda/D$ value for the auxiliary grating in system 10 of FIG. 1 is about 0.55 when the grating is used at the minimum deviation condition if the hologon has a $\lambda/D$ value of 1.0 and also is used at the minimum deviation condition. A surface-relief grating used for the auxiliary grating for this case would result in both poor radiometric system efficiency and intensity fluctuations since the higher order diffracted beams from the auxiliary grating can be multi-reflections interfere with the main first order scanning beam. By including the prism element in system 30 of FIG. 2, the $\lambda/D$ value of the auxiliary grating can be made to be in the range of 1.0 to 1.1 for the grating operated at the minimum deviation condition. For this $\lambda/D$ range, surface-relief transmission gratings can be used for the grating element while achieving high system radiometric efficiency. Surface-relief transmission gratings are advantageous since they can be manufactured with well established photoresist technology. Also, these gratings, unlike volume gratings, maintain high diffraction efficiency for large changes in the input/output beam angles. This property is important for both the hologon and the auxiliary grating element.

Figure 10B:
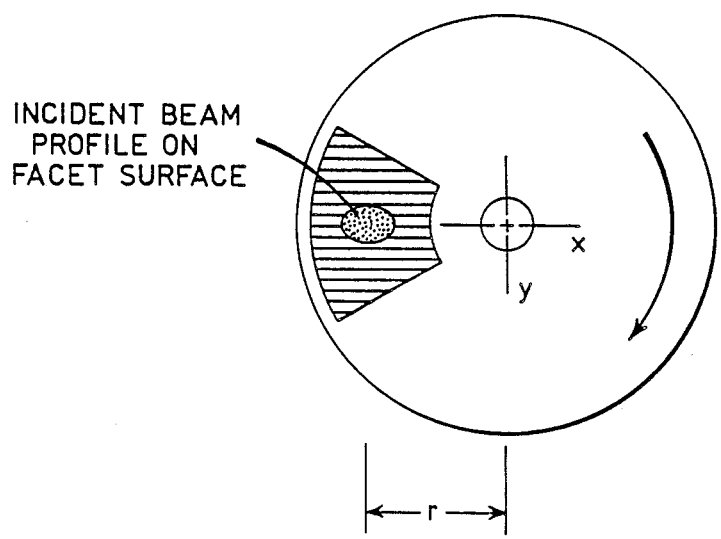

For a $\lambda/D$ value of 1.0, the second diffracted order, though very small, usually exists. The grating condition where the second diffracted order can just exist is calculated from the following equation $$\lambda/D = 2/3 \, N \qquad (3a)$$

where N is index of refraction of the medium in which the grating resides. This equation applies to the case where the grating is operated at the minimum deviation condition; that is $\theta_i = \theta_d$. If N = 1.63 (index for photoresist), the second diffracted order can not exist for $\lambda/D$ values greater than 1.087. By preventing the second diffracted order from existing, the radiometric efficiency of the system is improved and scan beam intensity fluctuations associated with the second order are avoided. Using a $\lambda/D$ value of greater than 1.087 for the hologon is very important when facets having radial grating lines are used as illustrated in FIG. 10B.

Accordingly, the system shown in FIG. 2 has the advantage in enabling the use of gratings having like $\lambda/D$ ratios and a value that improves both system radiometric efficiency and system radiometric scan uniformity.

A significant improvement afforded by the system shown in FIG. 2 is correction of the ellipticity in the spot on the image surface which forms the scan line as the scan beam is deflected. This is the spot defined by the intersection of the scan beam and the image surface. At the center of scan where the diffraction angle equals the incidence angle, the ellipticity is corrected. However, on opposite sides of the center of scan the image spot becomes elliptically shaped as described previously herein. The major axis of the ellipse is rotated in opposite directions on opposite sides of the center of scan.

The auxiliary grating 16 magnifies the image spot ellipticity, so that ratio of the length of the major to minor axes of the ellipse increases. The scan angle is limited by the amount of the spot ellipticity. It is desirable to reduce the spot ellipticity so as to enable the scan angles to be increased. Increased scan angles has the advantage of reducing the size of the deflection system, since the distance between the image surface and the deflector for like scan line lengths can be reduced.

A grating has greater dispersive power than a prism. Even though the grating may provide higher bow correction and bow band reduction than a prism, the use of a grating may be limited because of the image spot ellipticity problem. The dispersive optical element, exemplified by the prism 32 in FIG. 2, reduces spot ellipticity.

Image spot ellipicity in the scan beam leaving the hologon was previously explained. When a dispersive element such as a prism or grating is included between the hologon and image plane for scan line bow correction, the element also increases (magnifies) the ellipticity of the scanning spot. This increase in spot ellipicity occurs because the scanning beam on the bow compensation element (prism or grating) has an elliptical profile. If the bow compensation element is used at the minimum deviation condition for the center of scan, the beam has the same profile shape on the entrance and exit surfaces of the bow compensation element, and therefore, the beam leaves the element with the same cross-sectional profile that was incident to the element. When the beam scans from the center of scan position, the bow compensation element is used further from the minimum deviation condition. Therefore, the beam profile changes from the entrance to the exit surfaces of the bow compensation element progressively more as the beam scans further from the center of scan. The change in beam profile between entrance and exit surfaces results in a corresponding change in the cross-sectional profile of the beam leaving the bow compensation element.

When the dispersion of the bow compensation element is in the same direction as that of the hologon, as is the case in the FIG. 1 system, the bow compensation introduces ellipicity into the beam which is in the same direction as that introduced by the hologon, and therefore, the bow compensation element magnifies the ellipicity in the scanning beam. When the dispersion of the bow compensation element is opposite to that of the hologon, like the prism 32 element in FIG. 2, the element magnifies the bow in the scan beam, introduces ellipicity into the beam which is in the opposite direction of that introduced by the hologon. It is experimentally observed that when prism element 32 in FIG. 2, doubles the bow in the scan beam, it essentially eliminates the ellipticity in the scan beam introduced by the hologon. The scan beam exiting the prism element 32 for this condition is essentially circular in cross-section when the incident beam to the hologon has a circular cross-section and the hologon is used at the minimum deviation condition. Accordingly, the spot on the auxiliary grating remains generally circular across the entire scan and the elliptical error in the scanning spot on the image surface is reduced. The system shown in FIG. 2 may therefore be operative over larger scan angles than the system shown in FIG. 1 while maintaining the advantages of reduced scan-line deviation in straightness due to bow and providing further advantages of radiometric efficiency and second order diffraction effect avoidance by allowing the use of $\lambda/D$ ratios equal to 1.087 or greater.

Figure 3:
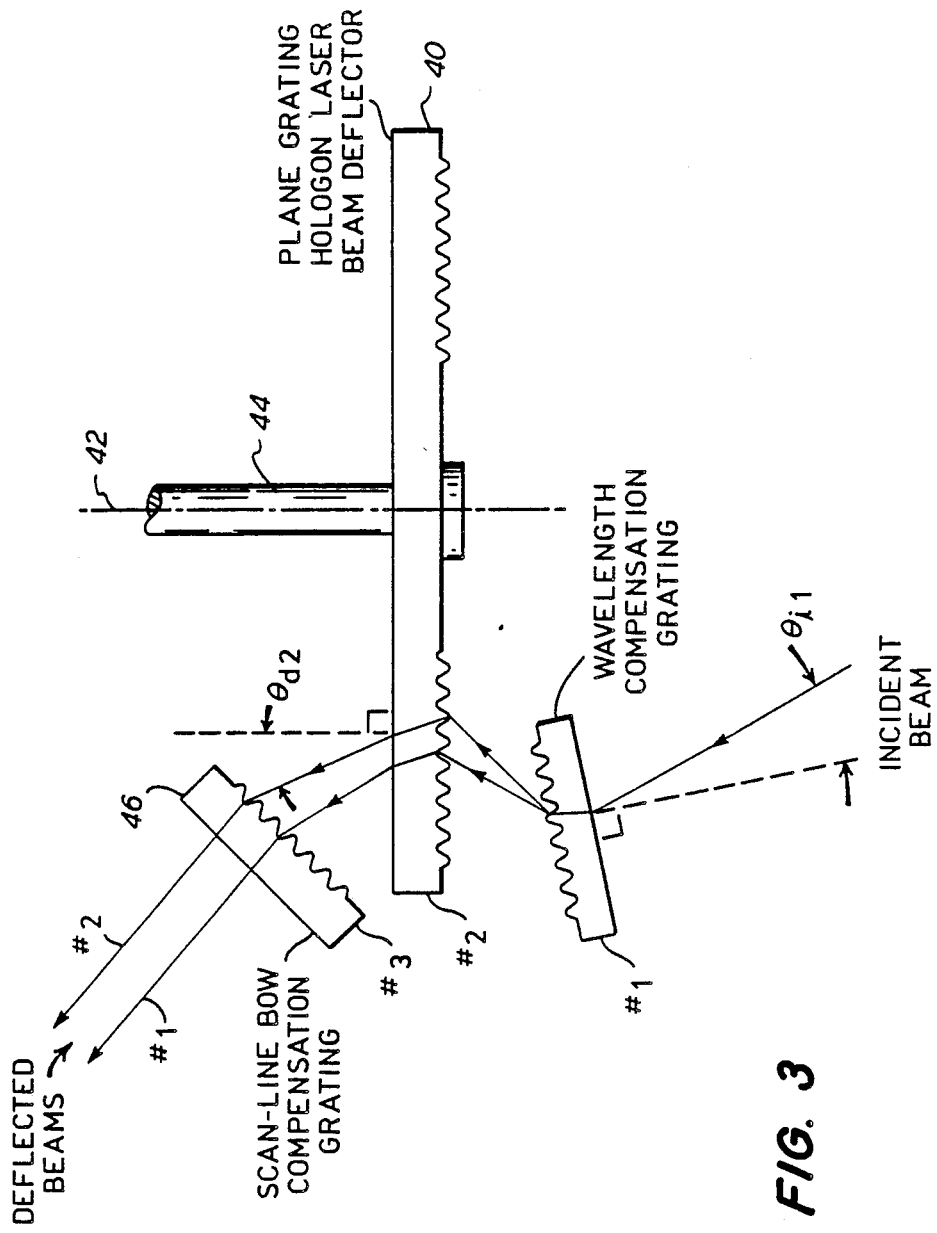
FIG. 3 is a diagrammatic view similar to FIGS. 1 and 2 showing a hologon deflector system utilizing a scan line bow compensation grating and a wavelength compensation grating in such geometric relationship with the hologon deflector as to optimally compensate for wavelength shift.

Consider next the aspect of this invention for correcting for wavelength shifts. FIG. 3 shows a plane grating hologon laser beam deflector 40 similar to the hologons shown in FIGS. 1 and 2. The deflector is rotatable about an axis of rotation 42 by a motor, not shown, which may be incorporated as discussed in connection with FIG. 1. Only the shaft 44 is shown. The hologon is shown in inverted position to illustrate that the position of the hologon may be arranged to suit the scanning application. There is a scan line bow compensation grating 46. The focusing lens and image surface is not shown to simplify the illustration. Wavelength shifts are corrected by a wavelength compensation grating 48 which has the feature of being tilted at a predetermined angle with respect to the plane (perpendicular to the axis of rotation 42) in which the hologon gratings rotate. An incident beam is shown and two output beams indicated as #1 and #2 to illustrate two laser wavelengths, $\lambda_1$ and $\lambda_2$.

Figure 4:
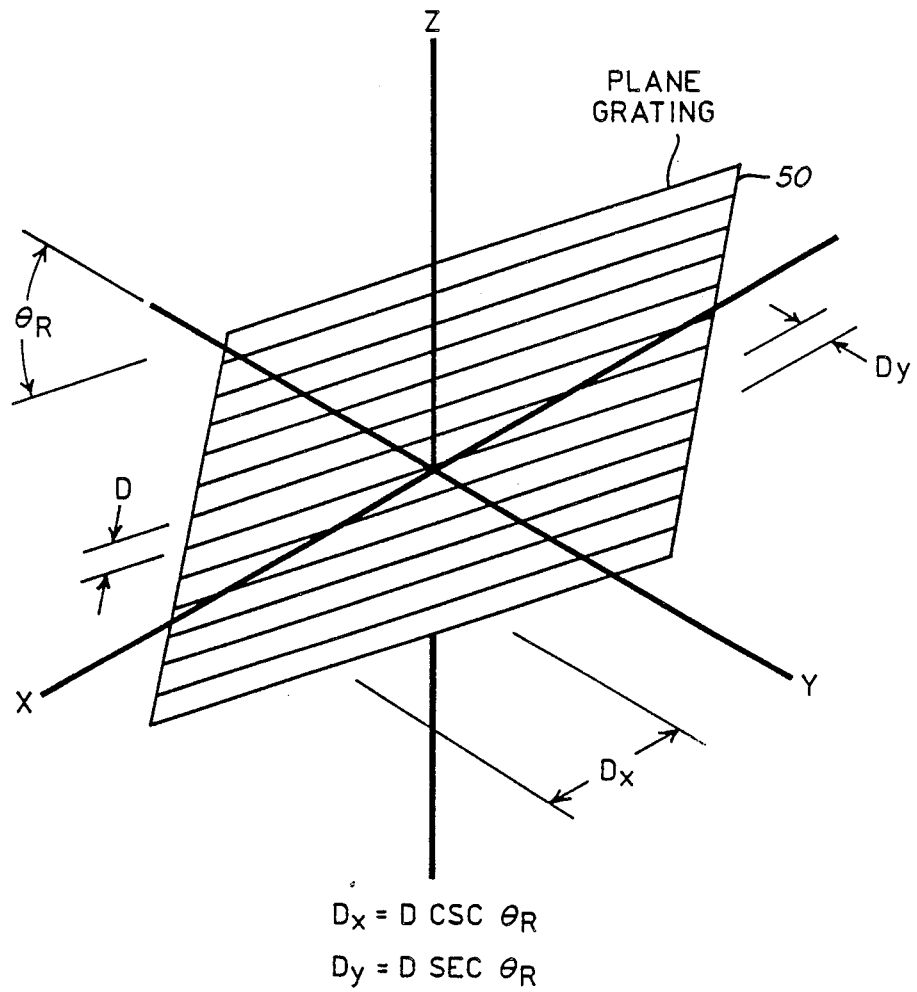
FIG. 4 is a diagram illustrating the orientations in orthogonal, x, y and z directions where the z direction is the direction of the axis of rotation of the hologon, which shows the relationship of the angles and axes in the equations which are presented below in connection with the description of wavelength compensation.

FIG. 4 schematically illustrates the axes which are used in the equations presented below. The z axis is the axis of rotation 42, the gratings illustrated schematically by a rectangle 50 denoting one of the grating facets of the hologon 40 rotates in the x,y plane which is perpendicular to the z axis of rotation. The x, y and z axes are orthogonal to each other. $\theta_R$ is the rotation angle which is denoted $\theta_r$ in the following equations. The periodicity of the grating is D. The effective periodicity in the x and y directions is shown as $D_X$ and $D_Y$. Thus if initially the hologon grating lines are parallel to the x axis for the center of scan, the relative change in hologon grating periodicity along the x and y axes as a function of rotation angle $\theta_r$ is:

$$D_X = D/\sin\theta_r = D \csc \theta_r \quad (4)$$

$$D_Y = D/\cos \theta_r = D \sec \theta_r. \quad (5)$$

For the disc hologon deflector at minimum deviation condition, $\theta_i$ approximately equal to $\theta_d$, the incidence and diffraction angles, the scan beam angle $\theta_s$ is approximately equal to $K\theta_r$, where $K = \lambda/D$ and $\lambda$ is the optical wavelength. See equation (1) above.

It will be shown that by tilting the wavelength compensation grating 48, wavelength shifts which would otherwise cause cross-scan errors may be corrected over a wide range of geometries. Such cross-scan errors can present a difficulty when mode hopping in the laser source may occur. Presently, mode hopping occurs in diode laser sources.

The above-referenced U.S. Pat. No. to Kay, 4,428,643, shows that wavelength related cross-scan positional beam errors in hologon deflectors could be corrected by utilizing a stationary wavelength compensation grating having the same periodicity as the hologon. The wavelength compensation grating separates the incident beam into two diffracted beams having different angles with regard to the normal to the grating surface. When the wavelength compensation grating is parallel to the hologon facet surface (parallel to the plane in which the hologon rotates), the two diffracted beams have incident angles with respect to the normal to the hologon surface that are equal to the diffraction angles they have with regard to the compensation grating surface normal. According to the reversal rule of optics, if the compensation grating and hologon have identical grating periodicity and are parallel, the beams of different wavelength (beams #1 and #2) leave the hologon with identical diffraction angles no matter what their wavelength difference, and therefore, are focused to a common image spot by the focusing lens following the hologon. The Kay patent teaches only the case where the wavelength compensation grating is parallel to the hologon and has identical periodicity to the hologon.

In accordance with the invention, geometrical relationships are provided whereby the wavelength compensation grating does not have to be parallel to the hologon and does not have to have the identical grating periodicity as the hologon in order to compensate for wavelength shift. In addition, the geometry provided by the invention also is operative to compensate for wavelength shift where a bow correction element, such as the grating 46 is included in the deflector system.

The invention will be best understood from the mathematical relationships involved which include equations (4) and (5) above. In the following equations, the wavelength compensation grating 48 will be grating #1, the hologon grating 40, #2, and the scan line bow compensation grating 46, #3.

In order to calculate the cross-scan error as a function of wavelength change, the grating equation is differentiated with respect to wavelength. Consider only two gratings, #1 and #2. The grating equations are:

$$\sin\theta_{i1} + \sin\theta_{d1} = \lambda/D_1 \quad (6)$$

$$\sin\theta_{i2} + \sin\theta_{d2} = \lambda/D_2 \quad (7)$$

where $\theta_{in}$ and $\theta_{dn}$ are, respectively, the incident and diffracted beam angles, $D_n$ is the grating periodicity and n designates the grating (#1 being the wavelength compensation grating 48 and #2 being the hologon grating 40) as discussed above. Differentiating equations (6) and (7) with respect to the change in wavelength, $d\lambda$, and setting $d\theta_{i2} = d\theta_{d1}$, results in the change in $\theta_1$ d2 with respect to $\lambda$ for the center of scan:

$$d\theta_{d2} = \frac{D_1\cos\theta_{d1} - D_2\cos\theta_{i2}}{D_1 D_2 \cos\theta_{d1}\cos\theta_{d2}} d\lambda \quad (8)$$

When the wavelength compensation grating 48 completely corrects for wavelength shift, $d\theta_{d2}=0$, and:

$$D_1\cos\theta_{d1} = D_2\cos\theta_{i2} \quad (9)$$

If $D_1 = D_2$, then equation (9) is satisfied when $\theta_{d1} = \theta_{i2}$ and the two grating elements are parallel, that is when the hologon facet grating lines are parallel to the grating lines of the wavelength compensation grating. When the hologon rotates from this parallel alignment position, its relative grating periodicity no longer matches that of the wavelength compensation grating, and wavelength shifts introduce cross-scan beam positional errors. See equations (4) and (5) for the change in relative grating periodicity with hologon rotation angle.

It has been found in accordance with the invention that when $D_1$ is not equal to $D_2$, equation (9) can still be satisfied by having $\theta_{d1}$ not equal to $\theta_{d2}$ (tilted with respect to the plane in which the hologon grating 40 rotates) as shown in FIG. 3. It can also be shown that by selecting the tilt angle and/or the periodicity of the wavelength compensation grating, the wavelength shift introduced by the scan line bow compensation grating 42 can also be corrected.

It is also desirable to totally correct the cross-scan error sensitivity to wavelength shift between the center of scan and the end of scan; for example for the 0.7 scan field position. This is not possible with an arrangement where the compensation grating period is the same as that of the hologon, and the wavelength compensation grating 48 is parallel to the hologon grating rotation plane, since complete correction then is afforded only at the center of scan. Minimizing the cross-scan error can be accomplished by the tilted geometry and/or with a grating period different from that of the hologon that matches the relative hologon periodicity for $\theta_r$ corresponding to the 0.7 scan field position and the compensation grating parallel to the hologon. It is preferable to use the tilted geometry. Then, the wavelength compensation grating 48 can have the same periodicity as the hologon. Then, the wavelength compensation grating is tilted so that its wavelength dispersion power matches that of the hologon when $\theta_r$ corresponds to the 0.7 scan field position. One reason why the tilted geometry is preferable is that every scan angle requirement can be satisfied using only one grating periodicity for both the hologon and the compensation grating 48.

The geometry may be designed (the relative wavelength dispersion of the hologon at the 0.7 scan field position determined) by determining the change in hologon diffraction angle as a function of both $d\lambda$ and hologon rotation angle. The hologon diffraction angle for each rotation angle is provided by the directional cosine with the z axis, which can be written as:

$$\sin^2\theta_{d2} = K_2^2 \sin^2\theta_r + (K\cos\theta_r - \sin\theta_{i2})^2 \quad (10)$$

where $K_2 = \lambda/D_2$. Differentiating equation (10) with respect to $d\lambda$ and setting $d\theta_{i2}=d\theta_{d1}$, gives the change in $\theta_{d2}$ with both $d\lambda$ and $\theta_r$ as follows:

$$\frac{d\theta_{d2}}{d\lambda} = \quad (11)$$

$$\frac{D_1\cos\theta_{d1}(K_2 - \sin\theta_{i2}\cos\theta_r) - D_2\cos\theta_{i2}(K_2\cos\theta_r - \sin\theta_{i2})}{D_1 D_2 \cos\theta_{d1} \sin\theta_{d2}\cos\theta_{d2}}$$

When the wavelength compensation grating compensation completely corrects for wavelength shift, $d\theta_{d2}=0$, and:

$$D_1\cos\theta_{d1} = \frac{D_2\cos\theta_{i2}(K_2\cos\theta_r - \sin\theta_{i2})}{K_2 - \sin\theta_{i2}\cos\theta_r} \quad (12)$$

For the case where $D_1 = D_2$ equation (12) becomes:

$$\cos\theta_{d1} = \frac{\cos\theta_{i2}(K\cos\theta_r - \sin\theta_{i2})}{K - \sin\theta_{i2}\cos\theta_r} \quad (13)$$

Equations (12) and (13) can be used to determine the tilt angle of the wavelength compensation grating 48 at any scan angle, such as for the 0.7 scan field position.

As an example consider the case where both the hologon 40 and the wavelength compensation grating have $K=1.00$, $\theta_{i2}=30.8°$ and the maximum scan beam angle is 18°, corresponding to $\theta_r=18°$. At the 0.7 scan field position, $\theta_r=12.6°$. Then the compensation grating 48 should be rotated 6.41° in the counterclockwise direction. The incident beam angle to the wavelength compensation grating must increase by 0.48° from the case where the compensation grating 48 and the hologon 40 are parallel. With these two angular adjustments, the wavelength compensation grating provides the required dispersion match for the hologon 0.7 scan beam field position. Overall the cross-scan error due to wavelength shift is half as large (the band of the error is half as large) a obtained using the method described in Kay Pat. No. 4,428,643, when considering the error for 0.2 nanometer (nm) wavelength shift associated with a mode hop in a diode laser source having, $\lambda=670$ nm. When $K=1.0$ for both the hologon and wavelength compensation grating, $\theta_r=18°$, and the focal length F of the focusing lens is 550 mm, the maximum cross-scan error is 15 $\mu$m utilizing the tilted geometry as against 28.6 $\mu$m for the case described in the Kay patent.

Consider next the case where a bow compensation element, particularly for this example the grating 46, is used to correct for bow in the scan beam exiting the hologon. In the case of a prism, such as used in the Holotek StraightScan-2P Deflector System, the dispersion effect of the bow compensation prism element can be accounted for by reducing the tilt angle of the compensation grating 48 so that its dispersion cancels that of the hologon. For example, if the computations discussed above were made for the 0.6 scan field position instead of the 0.7 scan field position, the introduction of a bow compensation prism element would be taken into account and the wavelength shift essentially corrected.

The dispersion of the scan line bow compensation grating 46 is of the same magnitude and in the same direction as that of the hologon 40, and therefore must be compensated for by the wavelength compensation grating. To calculate the cross-scan error as a function of wavelength change for the three grating case, the grating equation for the bow compensation grating 46 is used. This equation is:

$$\sin\theta_{i3} + \sin\theta_{d3} = \lambda/D_3 \qquad (14)$$

Differentiating equation (14) with respect to $d\lambda$ and setting $d\theta_{i3} = -d\theta_{d2}$, gives the change in $\theta_{d3}$ for the center of scan when the equation (8) value is used for $d\theta_{i2}$:

$$d\theta_{d3} = \frac{D_1 D_2 \cos\theta_{d1}\cos\theta_{d2} + D_3\cos\theta_{i3}(D_1\cos\theta_{d1} - D_2\cos\theta_{i2})}{D_1 D_2 D_3 \cos\theta_{d1}\cos\theta_{d2}\cos\theta_{d3}} d\lambda \qquad (15)$$

The system is corrected for wavelength shifts for the center of scan when $d\theta_{d3}=0$, and:

$$D_1\cos\theta_{d1} = \frac{D_2 D_3 \cos\theta_{i2}\cos\theta_{i3}}{D_2\cos\theta_{d2} + D_3\cos\theta_{i3}} \qquad (16)$$

Given the values for hologon 40 gratings (#2) and the bow compensation grating 46 (#3), equation (16) can be satisfied by a large number of values of $D_1$ and $\theta_{d1}$. For the special case where $D_1=D_2=D_3$, $\lambda/D=0.81$ and $\theta_{i2}\approx\theta_{d2}\approx\theta_{i3}\approx\theta_{d3}\approx 23.89°$ equation (16) becomes:

$$\cos\theta_{d1} = \frac{\cos\theta_{i2}}{2} \qquad (17)$$

Then, $\theta_{d1}=62.8°$, corresponding to $\theta_{i1}=-4.55°$.

An equation for the cross-scan positional beam error due to wavelength shift for each hologon rotation angle is obtained by differentiating equation (14) with respect to $d\lambda$ and setting $d\theta_{i3}=-d\theta_{d2}$, where equation (11) is used for the $d\theta_{d2}$ value. By setting $\theta_{d3}=0$, the condition for total correction of wavelength shift as a function of hologon rotation angle is as follows:

$$D_1\cos\theta_{d1} = \frac{D_2 D_3 \cos\theta_{i2}\cos\theta_{i3}(K_2\cos\theta_r - \sin\theta_{i2})}{D_3\cos\theta_{i3}(K_2 - \sin\theta_{i2}\cos\theta_r) - D_2\sin\theta_{d2}\cos\theta_{d2}} \qquad (18)$$

Analogously to the discussion given above with regard to equation (13), equation (16) can be solved for the tilt angle and incidence angle on the wavelength compensation grating 48 for the 0.7 or any other scan field position. As noted above the solution for the 0.7 scan field position minimizes the cross-scan error associated with wavelength change for the total scan field.

Figure 5:
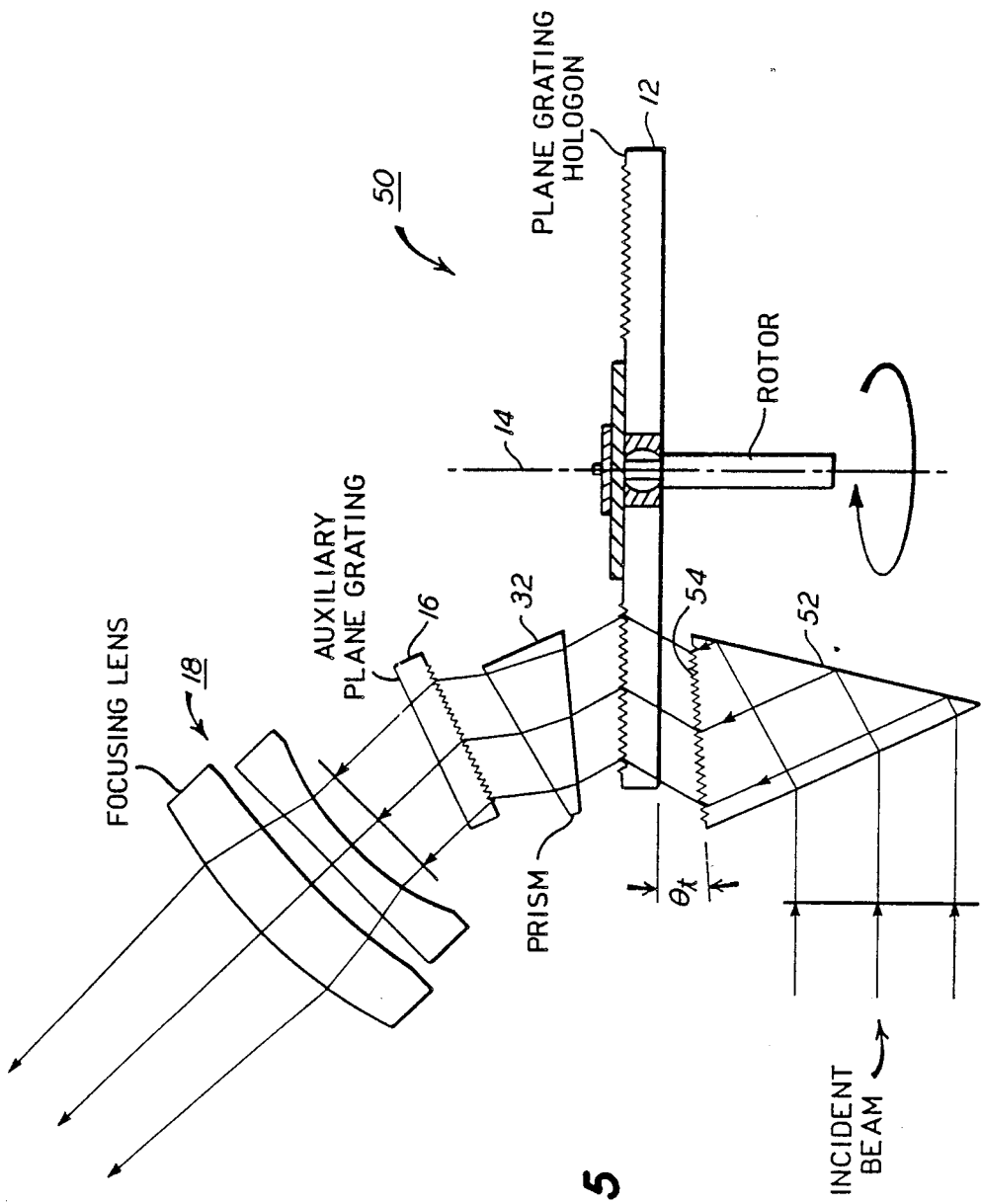
FIG. 5 is a view similar to FIG. 2 and further including a beam directing (steering) prism and wavelength compensation grating.

Referring to FIG. 5 there is shown a hologon deflector system 50 similar to that shown in FIG. 2, like parts being identified with like reference numerals. A beam steering prism 52 is included. This prism has a wavelength compensation grating 54 on the output surface thereof. This grating may be formed holographically by techniques similar to those used to make the hologon. Alternatively a separately formed grating may be used. The tilt angle, $\theta_t$, is set in accordance with the design equations given above to compensate for wavelength shift in the hologon 12 and in the bow correcting elements 16 and 32. The prism 52 has the advantage that it is relatively small and may be used under the hologon (where compound mirrors would not fit) in close proximity to the motor which drives the hologon 12.

Figure 6:
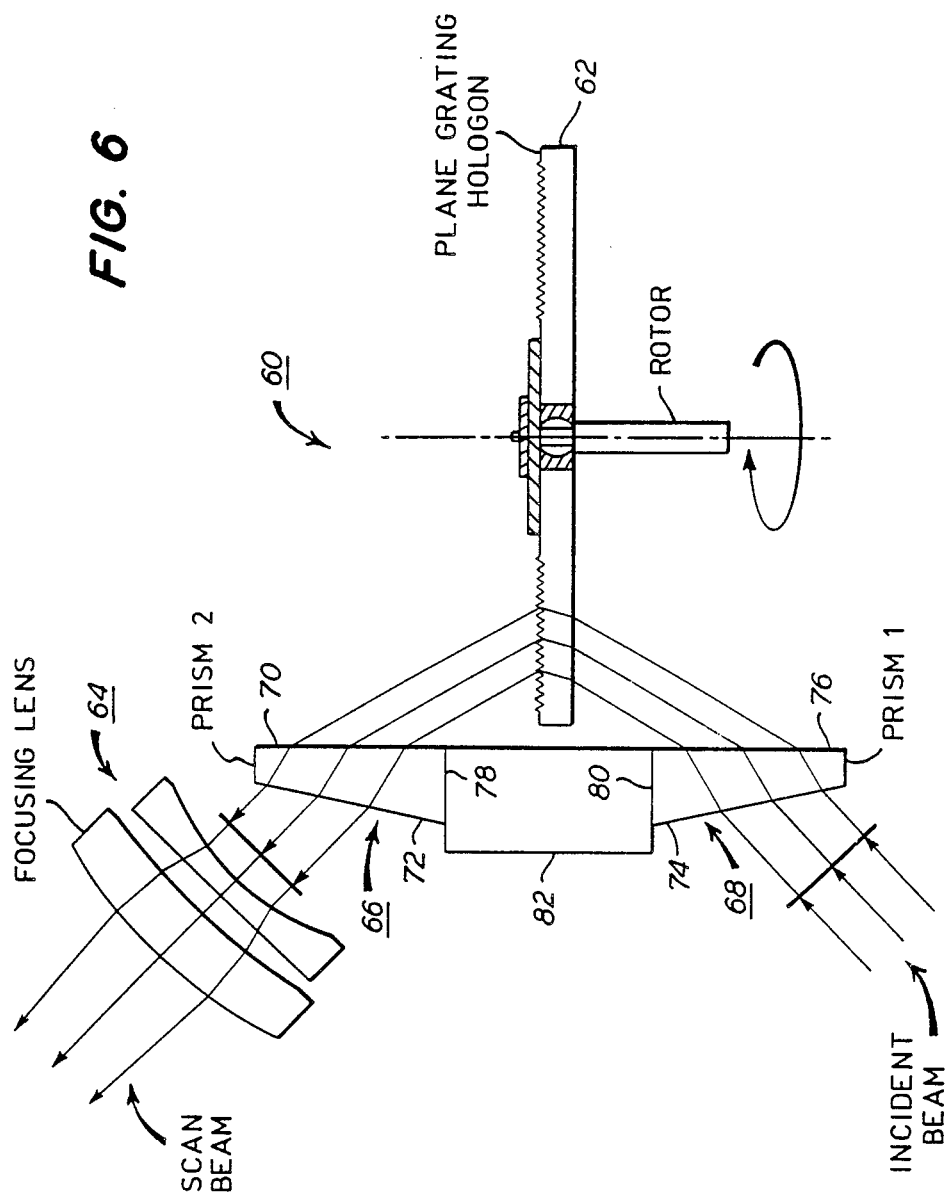
FIG. 6 is a diagrammatic elevational view illustrating a hologon deflector system using prisms between which a plane grating hologon is effectively sandwiched for controlling the cross-scan spot size on the hologon while providing for scan line bow correction.

Referring to FIG. 6 there is shown a deflector system 60 having a plane grating hologon 62 of the same design as discussed in connection with FIG. 1. The deflector includes a focusing lens 64 which images the scan beam to a spot on an image surface (not shown). The deflector system 60 incorporates two identical prism elements 66 and 68. The shape of these elements is the same. They have input and output surfaces (70 and 72 in the case of the prism 66 (called "Prism 2" in FIG. 6) and input and output surfaces 74 and 76 in the case of prism 68 (called "Prism 1" in FIG. 6).

The bases 78 and 80 of these prisms 66 and 68 are rigidly connected to a support 82. They may be glued to the support. While the prisms are shown aligned with their faces 70 and 76 in the same plane, they may be moved in a direction along their bases on the top surfaces of the support member 82 for alignment purposes to slight offsets. Because of this rigid coupling, movements due to forces on one prism are transferred to the other through the support. Such forces may be vibration which would tend to cause movement of the prisms 66 which would introduce scan position errors. Since the same forces (e.g. vibration) are applied to the other prism 74, they are compensated thereby reducing errors.

The prism 68 demagnifies the incident beam (in the direction of prism dispersion) on the hologon so that a smaller spot is formed in the cross-scan direction. In other words the prism 68 is designed to be far from the minimum deviation condition.

The second prism 66 is designed to compensate for scan line bow and also to magnify the cross-sectional size of the beam. This anamorphic beam expansion after the hologon is advantageous in that it can improve both the scan duty cycle and scan beam tracking error of the system. This is because there is associated with an increase in beam size, a decrease in beam angular magnification. Beam magnification for prism and grating elements is given by 1/R, the output beam diameter to input beam diameter ratio. The equation defining this ratio for a grating is given above. See equation (2). The equation for a prism is:

$$R_p = \frac{\cos\phi_1'\cos\phi_2}{\cos\phi_1\cos\phi_2'} \qquad (19)$$

where $\phi_1$ is the angle that the beam makes with respect to the normal to the input surface, $\phi'_1$ is the angle that the beam makes with respect to the normal to the input surface within the prism because the index of the prism differs from index of air, $\phi_2$ is the angle that the beam makes with the normal to the output surface in exiting the prism and $\phi'_2$ is the angle that the beam internally to the prism makes with the normal to the output surface.

Because the hologon 62 is positioned between the two prism elements 66 and 68 the system scan beam tracking error is reduced. Because the hologon is disposed between the prism elements 66 and 68, there is, as noted above, a reduction in the incident cross-scan beam size on the hologon facet surface. This beam size reduction facilitates smaller radial facet size and/or higher hologon scan duty cycle. In this connection, it may be desirable to use facets having grating lines which are generally radial as illustrated in FIG. 10B. Then beam compression in the cross-scan direction using the pair of prisms shown in FIG. 6 can significantly improve the hologon scan duty cycle since the compression occurs in the direction of the facet rotation.

A specific example of the system 60 shown in FIG. 6 is as follows. The hologon 62 has a $\lambda/D$ ratio of 1.00, $\theta_i$ to the hologon 62 is equal to 30.8°, $\theta_s$ is 18°. The prisms have an index of 1.799. The apex angle between the surfaces 70, 72 and 74, 76 is approximately 12°. The incident beam angle on the input surface 70 of the bow compensation prism 66 is approximately 60° in order to minimize scan line bow. The magnification ratio is approximately 1.6. The output beam from the second prism is magnified 1.6 times in the prism deviation direction as compared to the input beam to that prism 66. The first prism 68 (prism #1) compensates for the anamorphic beam magnification in prism #2, but since it is rigidly coupled to prism #2 it also compensates for scan beam tracking error associated with vibrations and other spurious motions of prism #2. In essence the two prisms look like a single prism that operates at the minimum deviation condition with the hologon 62 sandwiched there between.

For this example, the tracking error from the hologon is reduced by 1.6 times to illustrate how the beam compression by Prism 1 improves scan system duty cycle and/or the scan speed of the hologon, consider the following hologon system parameters: $\lambda/D = 1.00$, $\theta_i = 30.8°$, hologon mean facet of 40 mm, $\theta_s = \pm 18°$, of $= 545$ mm, radial oriented grating lines, and an incident beam diameter of 12 mm. Without the beam compression by Prism 1, the cross-scan beam profile on the hologon facet is 13.85 mm, which gives a mechanical duty cycle of 66.9% for a hologon disc having 6 facets. This is the maximum number of facets and duty cycle for this case because the mechanical duty cycle must be larger than the angular duty cycle, which for this case is 60%. By using Prism 1 to compress the incident beam by 1.6 times, the cross-scan beam profile on the hologon facet is reduced to 8.66 mm. For 6 facets, the mechanical duty cycle is improved to 79.3%. If seven facets are put on the hologon disc, the mechanical duty cycle is 75.88% and the angular duty cycle is 70%. The usable duty cycle and the scan speed of system for a fixed RPM are both improved by 16.6% by using radial facets and incident beam compression.

The only problem of using radial oriented grating lines is that the facets must be kept very small or the second diffracted order must be prevented from existing. From Equation (3a) it is seen that for the minimum deviation condition, the hologon $\lambda/D$ value must be greater than 1.09 to prevent the second order from existing, if photoresist is used to form the gratings.

Figure 7:
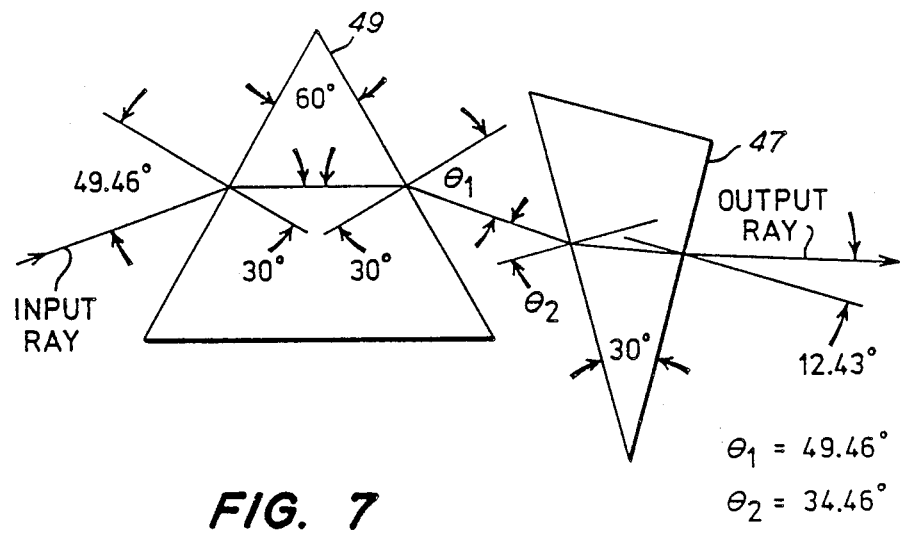
FIGS. 7, 8 and 9 show compound arrangements of prisms, gratings and lenses for scan line bow correction.

Referring to FIG. 7, there is shown another deviating element made up of a compound prism arrangement with two prisms, a right angle prism 47 and an equilateral prism 49. Some of the refraction power (ray bending power) of the large apex angle prism 48 is cancelled out by the smaller apex angle prism 47 which is oriented to have the opposite refraction power. With the apex angles and incidence angles, $\theta_1$ and $\theta_2$ shown in FIG. 7, the overall refraction power of the compound prism is close to the refraction power of a right angle prism. The multiple refracting surfaces of the compound prism shown in FIG. 7 introduces higher order terms in the bow curve for the prism system and thereby enables a better match to the bow curve of the hologon spinner to be obtained over its entire scan range (the trajectory of the scan line), thereby resulting in reduced bow for the total scanner system.

Figure 8:
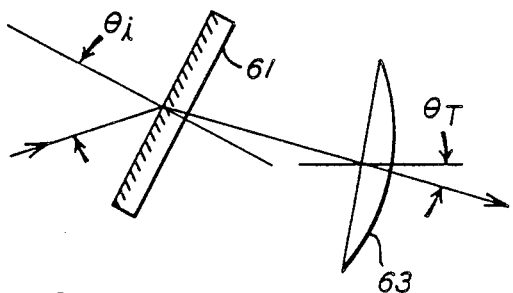
Figure 9:
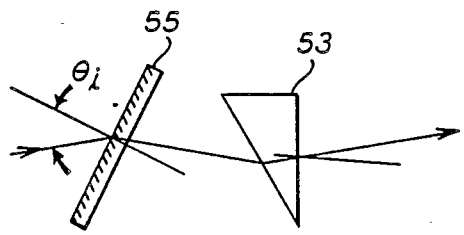

A compound grating arrangement similar to the compound prism arrangement shown in FIG. 7 may also be used to closer match the hologon spinner bow than with the compensating bow achievable with a single grating element. Also compound deviating elements as shown in FIGS. 8 and 9 may be used. FIG. 9 shows a compound deviating element utilizing the prism 53 and a grating element 55. A grating 61 and a tilted focusing lens 63 may similarly be used, as shown in FIG. 8. In FIG. 8 the bow from the hologon spinner is reduced from a very large value to a relatively small one by the use of the grating element 61 and then the remaining bow is reduced further by the tilted focusing lens 63 which has barrel or pin-cushion distortion, as described in Kramer U.S. Pat. No. 4,583,816, issued Apr. 22, 1986.

The use of the deviating element, including prisms or gratings, provides a greater freedom of design of scanner systems as well as improved operation of such systems. The invention enables almost any $\lambda/D$ value to be used in the hologon gratings, and nevertheless to obtain straight scan lines. Since $\lambda/D$ determines the duty cycle of the hologon, the duty cycle may be maximized when compared to hologons with $\lambda/D$ values necessary to obtain straight scans with optimal hologon spinner designs.

Utilizing the invention, bow free operation can be obtained for the case where $\theta_i$ is equal to o, i.e. a normal incident beam to the surface of the hologon spinner disc. Then, optical power can be incorporated into the hologon spinner facets, as by curving the facet grating lines, thereby eliminating the need for a focusing lens to produce a scanning spot in the image plane. Also overfilled operation (beam diameter greater than facet width) of facets with radially oriented lines and with beams at normal incidence to the hologon (which may have $\lambda/D = 1$) may be used to overcome ellipticity problems).

From the foregoing description it will be apparent that there has been provided improved hologon scanning systems. While various embodiments of the invention have been described, variations and modifications thereof within the scope of the invention will undoubtedly suggest themselves to those skilled in the art. Accordingly, the foregoing description should be taken as illustrative and not in a limiting sense.

I claim:

1. A hologon deflector apparatus having a rotatable disc hologon which deflects an optical beam along a bowed scan line on an image surface intersected by the beam as it is deflected, the improvement for compensating for scan line bow and for elipticity in the spot defined by the beam where it intersects said surface which comprises first dispersive means for magnifying the bow, and second dispersive means between said first dispersive means and said surface for compensating for the magnified bow.

2. The improvement according to claim 1 wherein said first and second dispersive means are stationary.

3. The improvement according to claim 1 wherein said first and second dispersive means deflect the beam in opposite directions.

4. The improvement according to claim 3 wherein said first dispersive means provides means for compensating for elipticity in the cross-section of said beam incident upon said second dispersive means.

5. The improvement according to claim 1 wherein said second dispersive means has its dispersion in the same direction as the dispersion of said hologon and said first dispersive means has its dispersion in a direction opposite to that of said hologon.

6. A hologon deflector system comprising a rotatable hologon disc having a grating on which an optical beam is incident and from which said beam is diffracted, said diffracted beam being deflected to scan a line on an image surface as said hologon rotates, first and second prisms in the path of said incident and diffracted beam respectively, said second prism having surfaces intersected by said diffracted beam as it enters and leaves said prism which are inclined with respect to each other and to said diffracted beam to compensate for bow of said scan line and to magnify the cross-scan dimension of said beam, said first prism having surfaces intersected by said incident beam which are inclined with respect to each other to demagnify the cross-scan dimension of said incident beam so as to reduce the cross-section of said beam incident upon said hologon.

7. The system according to claim 6 further comprising a focusing lens disposed in the path of said diffracted beam between said second prism and the image surface.

8. The system according to claim 6 further comprising a common support disposed adjacent to said hologon having opposite sides on which said first and second prisms are respectively rigidly coupled for conjoint movement under perturbing forces such as vibration.

9. The system according to claim 6 wherein said first and second prisms are identical in shape.

10. The system according to claim 6 wherein the surfaces of said prisms are inclined at such angles that the angle of incidence of said incidence beam entering said first prism is equal to the angle of said diffracted beam leaving said second prism such that said prisms and said hologon operate at a minimum deviation condition.

11. The system according to claim 6 wherein said second and first prisms have essentially the same magnification and demagnification, respectively.

12. A scanning system which comprises means for deflecting an incident optical beam across an image plane to define a scanned line which is bowed about the center of said line, the path of said optical beam to said center being the optical axis of said system, a plurality of optical elements disposed along said optical axis for deviating the beam as a function of the angle thereof from said optical axis to define a scan line on said image plane which is bowed in the opposite direction to the bow due to said deflecting means whereby to provide for essentially straight scanned lines on said image plane, at least one of said elements providing means for increasing said bow generated by said deflecting means.

13. The system according to claim 12 wherein said elements are a plurality of prisms.

14. The system according to claim 13 wherein a first of said plurality of prisms has a greater refraction power than a second of said plurality of prisms.

15. The system according to claim 14 wherein said second prism is oriented with respect to said first prism so that the refracting power of said second prism is opposite to the refracting power of said first prism.

16. The system according to claim 15 wherein said first and second prisms each have an apex angle along an edge defined by a surface thereon on which said beam is incident, said edges being perpendicular to said optical axis, said first prism having a greater apex angle than said second prism, and said edges of said first and second prisms being on opposite sides of said optical axis whereby said second prism partially cancels the refracting power of said first prism.

17. The system according to claim 12 wherein said elements include first and second element, said second element being a focusing lens having either barrel or pin-cushion distortion, said lens being disposed between said first element and said image plane, said beam passing through said lens, and said lens having an optical axis which is tilted with respect to said beam which is deviated by said deviating means in a sense to further minimize the bow of said scan line.

18. The system according to claim 17 wherein said focusing lens is a symmetrical lens.

19. The system according to claim 17 wherein said second element is a linear diffraction grating.

* * * * *